Patented Aug. 28, 1945

2,383,791

UNITED STATES PATENT OFFICE 2,383,791

POLYCARBOXYLIC ACID CONDENSATE OF A TERPENE ALCOHOL-FORMALDEHYDE PRODUCT

Mortimer T. Harvey, East Orange, N. J., assignor to Harvel Research Corporation, a corporation of New Jersey No Drawing. Application April 29, 1942,
Serial No. 440,983

2 Claims. (Cl. 260—67)

The present invention relates to condensation products of polycarboxylic organic acids with the products of condensation of formaldehyde with tertiary alcohols and to methods and steps of making and using said products.

An object of the present invention is to make a material which can be used for surface coatings, for impregnations, for molded products and articles and for use generally.

Another object of the present invention is to make a liquid condensation material which can be further condensed to a solid state and which can be used for general purposes.

Other objects and advantages of the present invention will appear for the following descriptive and illustrative disclosure and from the appended claims forming part hereof.

Stated generally, the present invention comprises condensing a tertiary alcohol with formaldehyde to obtain a liquid product, and condensing said liquid product, with a polycarboxylic organic acid.

In the appended claims, where a polycarboxylic organic acid is stated, both said acid and its anhydride are meant, for example, "maleic acid" is intended to mean both maleic acid itself and maleic anhydride, and "phthalic acid" is meant to cover both phthalic acid and phthalic anhydride.

The condensation products of formaldehyde and tertiary alcohols, used in making the products of the present invention, are disclosed and claimed in my copending applications, Ser. Nos. 190,038 filed Feb. 11, 1938; 202,361 filed April 15, 1938 and since abandoned; and 216,477 filed June 29, 1938. Examples of tertiary alcohol suitable for use in the practice of the present invention are pine oil, terpineol, tertiary butyl alcohol, tertiary amyl alcohol, the tertiary hexyl alcohols, and others, including the tertiary alcohols disclosed in the above identified copending applications to which reference is hereby made.

The above identified copending applications also disclose sulphuric acid and hydrochloric acid as suitable condensation catalysts for producing the aldehyde-tertiary alcohol condensation products used as reagents in the practice of the present invention.

The condensation products which may be used as reagents in the practice of this invention are the organic liquids obtained by heat condensation of formaldehyde and a monomeric terpene alcohol in contact with water and an acid catalyst, which organic liquid has a boiling point above 200° C. at 4 cm. of mercury and which has a specific gravity between about 1.09 to about 1.1 at 15° C. An illustrative method for producing one of said condensation products comprises heating a mole of pine oil together with from one mole to three moles of formaldehyde in contact with from about 0.01 mole to about 0.1 mole of acid selected from the group consisting of hydrochloric acid, sulphuric acid and monochloracetic acid to obtain a light colored organic liquid condensation reaction product which is a solvent for cellulose nitrate.

The following examples will illustrate methods and steps of making the products of the present invention and the products themselves.

*Example 1*

A. One mole of steam distilled pine oil and three moles of commercial formalin, water solution of formaldehyde (about 37.5%); with about one-half per cent (0.5%) of the total weight of the pine oil and the formalin of concentrated sulphuric acid in an equal volume of water, as condensing agent, 12 lbs. 8 ounces of steam distilled pine oil, about 20 lbs. 6 ounces of 37.5% $CH_2O$ solution, and about 47 c. c. conc. $H_2SO_4$ (C. P.) on 47 c. c. of water, are reacted as follows. The water solution of sulphuric acid is added to the formaldehyde solution, after which the steam distilled pine oil is added, and the mixture heated under a reflux condenser. At the beginning and for several hours during the heating the pine oil floats on the formaldehyde solution, but after about six or seven hours a reaction takes place whereby an oily liquid reaction product is formed which goes to the bottom of the container with the water present floating in it. The heating is then discontinued and the whole is neutralized by the addition of about 130 grams of NaOH dissolved in 230 grams of water. The neutralized material is cooled and the bottom, oil layer is siphoned off. This material is hereinafter called condensation product 1A and is an organic liquid having a boiling point above 200° C. at 4 cm. of mercury and has a specific gravity of between 1.09 to about 1.1 at 15° C.

B. About fifty (50) parts by weight of condensation product 1A and seventeen (17) parts by weight of maleic anhydride were heated under a reflux condenser for about one hour, at 150° C. The reflux condenser was then removed and the temperature raised to about 250° C. and held there for about fifteen (15) minutes and then cooled. A condensation reaction took place whereby was produced a product, hereinafter called condensation product 1B, which was thicker than condensation product 1A and was of about the consistency of new honey. This product can be thickened by continued heating through various stages of thickness to a hard rosin like consistency when cool.

Condensation product 1B is suitable by itself and also with other materials for making surface coating, impregnations and for general use. For example, the condensation product 1B, in amount resulting from the method of 1B, fourteen and four-tenths (14.4) by weight of glycerol and forty-six and one-half (46.5) parts of water white rosin are added and the whole heated up and held at about 250° C. for about fifteen (15) minutes (to form a hard bottom when cold). The mixture at this point was chilled back with one hundred and ten parts (110) of ester gum, and the temperature held at about 200° C. for about five minutes. This product, hereinafter called, product 1B2, is soluble in linseed oil and is suitable for use whenever ester gums, rosin and resins generally are used for making surface coating, impregnations and for general use. In this latter example it is considered that one —OH radicle of the glycerol reacts with one mole of the resin and two —OH radicles of the glycerol react with two carboxyl groups of the maleic anhydride.

Example 2

B. About 120 parts by weight of product 1A, described above, and 49 parts of maleic anhydride are heated under a reflux condenser for about two hours, after which about forty-six (46) parts of glycerol and about one hundred and thirty (130) parts of rosin are added and the whole heated under vacuum, first for about one and one-half hours at about 150° C., then for about 1½ hours at about 210° C., and finally for about one-quarter hour at about 240° C. In a receiver connected in the vacuum system about 18 parts by weight of water and about 16 parts of a light volatile oil are caught. The condensation product of the reaction is a dry, hard and pale resin.

Example 3

A. Three moles of formaldehyde and one mole of tertiary butyl alcohol, with 960 parts by weight of a commercial formaldehyde-water solution (37.5%), 296 parts of tertiary butyl alcohol and about 3 to 3.25 parts of concentrated $H_2SO_4$ are heated in a copper autoclave up to one hundred pounds pressure and held at that pressure for about one hour. The product of the reaction produced by these steps is neutralized and then made slightly alkaline, with NaOH, and then distilled at atmospheric pressure through a fractionating column and the cut to 97° C. taken off. This cut was then re-distilled through the fractionating column until a distillate commenced to come over which dissolves cellulose acetate, the temperature at this point being 87° C. This distillate, up to but not including the part at which it commenced to dissolve cellulose acetate, is called product a, and was about forty parts by weight. The residue from this re-distillation separated into two layers in the flask, water insoluble (or only slightly soluble), organic compounds in the upper layer and water containing dissolved organic compounds in the lower layer.

The main residue, from the first distillation, was then distilled at atmospheric pressure, without the fractionating column, until all of the water was removed, and to this distillate, which contained water and water insoluble organic material, was added the residue of the re-distillation described in the above paragraph and then the mixture was distilled through the fractionating column until no more water insoluble material came over with the distillate which contained a considerable proportion of water, when the distillation was discontinued. This distillate separated into two layers, a top layer of water insoluble organic material, here called product b, and a lower layer which is water containing some water soluble organic materials. The total yield of product b was about one hundred parts by weight.

The water-free residue obtained upon the re-distillation of the main residue, described in the next above paragraph, was distilled at reduced pressure at about forty millimeters of mercury up to a point where a material which is water insoluble came over, the distillate being called here product c, and the residue called product d. Said product c was about 285 parts by weight, is water soluble and has a specific gravity of 1.08. Said product d weighed about 120 parts and contained some salts.

In this Example 3 the term water insoluble is used to identify it from material which is completely soluble in water, and it is noted here that the products here called water insoluble are slightly soluble in water. Also, it is noted that certain mixtures of the products which are completely soluble in water and the products which are only slightly soluble in water form solutions which are soluble in water; for example, a mixture of product b with product c is soluble in water and also makes a solution which is a fairly fast solvent for cellulose acetate.

Product a is low-boiling (up to about 87° C.), is water soluble and dissolves cellulose nitrate.

Product b boils at an intermediate temperature (about 90° C. to about 130° C.), is water insoluble and dissolves cellulose acetate quickly.

Product c is high boiling (about 180° C. to about 250° C.), is water soluble and dissolves cellulose acetate slowly.

Example 3

B. About seventy parts by weight of said product c (of 3A above) and forty-nine parts of maleic anhydride are heated under a reflux condenser for about two hours in the manner of Example 2B, described above and the addition of glycerol and rosin carried on in the manner and in the proportions described in said Example 2B. The condensation product is a dry, hard and pale resin having a high melting point.

The reaction product of product c and maleic anhydride can be used at various stages of consistency from a slightly viscous liquid to a hard rosin-like consistency in a manner and for purposes similar to those described for product 1B above.

Example 4

A. About three moles of benzaldehyde and one mole of tertiary butyl alcohol and about 1% of their total weight in concentrated sulphuric acid are heated at about 300° F. for about six hours under a reflux condenser after which those materials are removed by distillation which have boiling points up to 205° F., and about sixteen parts of the residue are heated with seven parts of maleic anhydride for about one-half hour at about 200° to 220° F. The product is a very heavy viscous resin.

Similarly to the methods described above in Examples 1 to 4, the various condensation products of aldehydes and tertiary butyl alcohols disclosed in my said copending applications Ser. Nos. 190,038; 202,361; and 216,477 can be condensed with maleic acid or phthalic acid (or their anhydrides) to secure resins suitable for use in making varnishes, coatings, impregnations and so on and for use in the arts generally.

The present application is a continuation-in-part of my application Ser. No. 238,813 filed November 4, 1938.

Having thus described my invention, what I claim and desire to protect by Letters Patent is:

1. The product of condensation under acid condition of maleic anhydride with an organic liquid which is obtained by heat condensation of formaldehyde and a monomeric terpene alcohol in contact with water and an acid catalyst, which organic liquid has a boiling point above 200° C. at 4 cm. of mercury and which has a specific gravity of about 1.09 to about 1.1 at 15° C.

2. The resinifiable condensation product of material selected from the group consisting of maleic acid and phthalic acid with an organic liquid which is obtained by the heat condensation of formaldehyde and a monomeric terpene alcohol in contact with water and an acid catalyst, which organic liquid has a boiling point above 200° C. at 4 cm. of mercury and which has a specific gravity of about 1.09 to about 1.1 at 15° C.

MORTIMER T. HARVEY.